United States Patent
Brosnan et al.

(10) Patent No.: US 8,797,298 B2
(45) Date of Patent: Aug. 5, 2014

(54) OPTICAL FINGERPRINT NAVIGATION DEVICE WITH LIGHT GUIDE FILM

(75) Inventors: Michael J. Brosnan, Fremont, CA (US); Gary R. Trott, San Mateo, CA (US); Timothy James Orsley, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 627 days.

(21) Appl. No.: 13/029,766

(22) Filed: Feb. 17, 2011

(65) Prior Publication Data
US 2011/0141048 A1 Jun. 16, 2011

Related U.S. Application Data

(63) Continuation-in-part of application No. 12/359,191, filed on Jan. 23, 2009, now abandoned, and a continuation-in-part of application No. 12/487,359, filed on Jun. 18, 2009, now Pat. No. 8,487,914.

(51) Int. Cl.
*G06F 3/042* (2006.01)
*G06F 3/033* (2013.01)
*G09G 5/08* (2006.01)
*G06F 3/041* (2006.01)

(52) U.S. Cl.
CPC ........ *G06F 3/042* (2013.01); *G06F 2203/0338* (2013.01)
USPC ............................ 345/176; 345/157; 345/173

(58) Field of Classification Search
USPC .................................. 345/157, 173, 175–176
See application file for complete search history.

(56) References Cited

U.S. PATENT DOCUMENTS

| | | | |
|---|---|---|---|
| 5,644,139 A * | 7/1997 | Allen et al. | 250/557 |
| 5,698,845 A * | 12/1997 | Kodama et al. | 250/221 |
| 6,011,860 A | 1/2000 | Fujieda et al. | |
| 6,872,931 B2 | 3/2005 | Liess et al. | |
| 7,177,451 B2 | 2/2007 | Higuchi | |
| 7,313,255 B2 | 12/2007 | Machida et al. | |
| 7,358,514 B2 | 4/2008 | Setlak et al. | |
| 2004/0208346 A1* | 10/2004 | Baharav et al. | 382/124 |
| 2005/0069180 A1 | 3/2005 | Setlak et al. | |
| 2006/0028442 A1 | 2/2006 | Bynum et al. | |

(Continued)

OTHER PUBLICATIONS

Andreas Vogler, "Use of Integrated Optical Proximity Sensors in Multi-Function Smart Phones", Sep. 10, 2008, p. 1-4.

*Primary Examiner* — Ryan Lepisto
*Assistant Examiner* — Erin Chiem

(57) ABSTRACT

Embodiments of a finger navigation device are described. In one embodiment, the finger navigation device includes a light guide film (LGF), a light source, a sensor, and a navigation engine. At least a portion of the LGF exhibits total internal reflection (TIR) and the light source is in optical communication with the LGF and configured to inject light into the LGF. The sensor is configured to detect light that exits from the LGF after being reflected from a finger that is proximate the LGF and the navigation engine is configured to generate lateral movement information, which is indicative of lateral movement of the finger relative to the sensor, in response to light that is reflected from the finger and detected by the sensor. Other embodiments of the finger navigation device are also described.

20 Claims, 15 Drawing Sheets

(56) References Cited

U.S. PATENT DOCUMENTS

| | | |
|---|---|---|
| 2007/0086630 A1 | 4/2007 | Setlak et al. |
| 2007/0125937 A1* | 6/2007 | Eliasson et al. ............... 250/221 |
| 2007/0279935 A1* | 12/2007 | Gardiner et al. .............. 362/610 |
| 2008/0049989 A1 | 2/2008 | Iseri et al. |
| 2008/0204418 A1 | 8/2008 | Cybart et al. |
| 2008/0284735 A1 | 11/2008 | Shim |
| 2009/0067151 A1* | 3/2009 | Sahlin et al. .................... 362/23 |
| 2009/0267919 A1* | 10/2009 | Chao et al. .................... 345/175 |

* cited by examiner

OPTICAL FINGERPRINT NAVIGATION DEVICE WITH LIGHT GUIDE FILM

CROSS-REFERENCE TO RELATED APPLICATION

This application is a Continuation-In-Part of copending application Ser. No. 12/359,191, filed on Jan. 23, 2009, and a Continuation-In-Part of copending application Ser. No. 12/487,359, filed on Jun. 18, 2009, the entire disclosures of which are incorporated herein by reference.

BACKGROUND

Optical navigation devices use a light source to illuminate a navigation surface so that an optical imager can generate digital images for computing motion. For example, an optical imager can image a finger on a surface and generate a navigation signal based on comparisons of sequential images. However, as the size of conventional navigation devices is reduced, the physical space for the imager for detecting the optical navigation input are also reduced.

Some conventional optical navigation device packages have a thickness, or optical height, of about 2.5 mm. The optical height refers to the distance from an optical finger interface surface to a corresponding sensor. The optical height is also referred to as the optical track. An optical track, or thickness, of 2.5 mm is considered too thick for some implementations of handheld devices such as cellular telephones and small portable personal computing (PC) peripherals.

Many optical navigation devices use a discrete element called a light guide to channel light from the light source to the navigation surface. Light from the light source travels through the light guide until it intersects with a boundary of the light guide. When the light intersects with the boundary of the light guide, it either partially exits the light guide and partially reflects within the light guide, or completely reflects off the boundary of the light guide, traveling in a new direction within the light guide. This type of reflection is called "total internal reflection" (TIR), and is dependent upon the angle of incidence of the light with the boundary and the refractive indices of the light guide and the material outside the light guide. The light guide is typically a molded piece of clear plastic, and the thickness of the light guide element directly adds to the overall thickness of the optical navigation device.

SUMMARY

Embodiments of a finger navigation device are described. In one embodiment, the finger navigation device includes a light guide film (LGF), a light source, a sensor, and a navigation engine. At least a portion of the LGF exhibits total internal reflection (TIR) and the light source is in optical communication with the LGF and configured to inject light into the LGF. The sensor is configured to detect light that exits from the LGF after being reflected from a finger that is proximate the LGF and the navigation engine is configured to generate lateral movement information, which is indicative of lateral movement of the finger relative to the sensor, in response to light that is reflected from the finger and detected by the sensor. Other embodiments of the finger navigation device are also described.

Embodiments of another optical finger navigation device are described. In one embodiment, the finger navigation device includes a circuit board substrate, a sensor, an LGF, a light source, and a navigation engine. The sensor is attached to the circuit board substrate, the sensor including an array of distinct photodetectors. The LGF is attached to the circuit board substrate and located proximate the sensor such that the sensor is between the circuit board and at least a portion of the LGF. The light source is attached to the circuit board substrate and configured to inject light into an edge surface of the LGF and the navigation engine is configured to generate movement information, which is indicative of movement of a finger relative to the sensor, in response to light that is reflected from the finger and detected by the sensor. Other embodiments of an optical finger navigation device are also described.

Embodiments of a portable electronic system are described. In one embodiment, the portable electronic system includes a display, an optical finger navigation device, a LGF, a light source, a sensor, and a navigation engine. The display includes a navigation indicator and the optical finger navigation device is configured to generate a navigation signal to move the navigation indicator based on a change in a detected light pattern according to movement of a finger relative to the optical finger navigation device. The optical finger navigation device includes the LGF, wherein at least a portion of the LGF exhibits TIR. The light source is in optical communication with the LGF and configured to inject light into the LGF and the sensor is configured to detect light that exits from the LGF after the light is reflected from the finger. The navigation engine is configured to generate lateral movement information, which is indicative of lateral movement of the finger relative to the sensor, in response to light that is reflected by the finger and detected by the sensor. Other embodiments of a portable electronic system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

A film is used as a light guide in some embodiments. The light guide film (LGF) is thinner than a traditional light guide, and as a result, a thinner optical finger navigation device may be produced using an LGF. Additionally, in some embodiments, the LGF includes light extracting features that cause light to exit the LGF. In an embodiment, the light extracting features are non-planar elements that interact with a finger to modify the scattering of light. The geometry of the non-planar elements increases the amount of light that escapes the LGF; as a result, the image detected by a sensor is more intense and easier to detect. Consequently, the amount of light fed to the LGF can be reduced and battery power can be conserved. A sensor detects the modified scattering of light.

Figure 1:
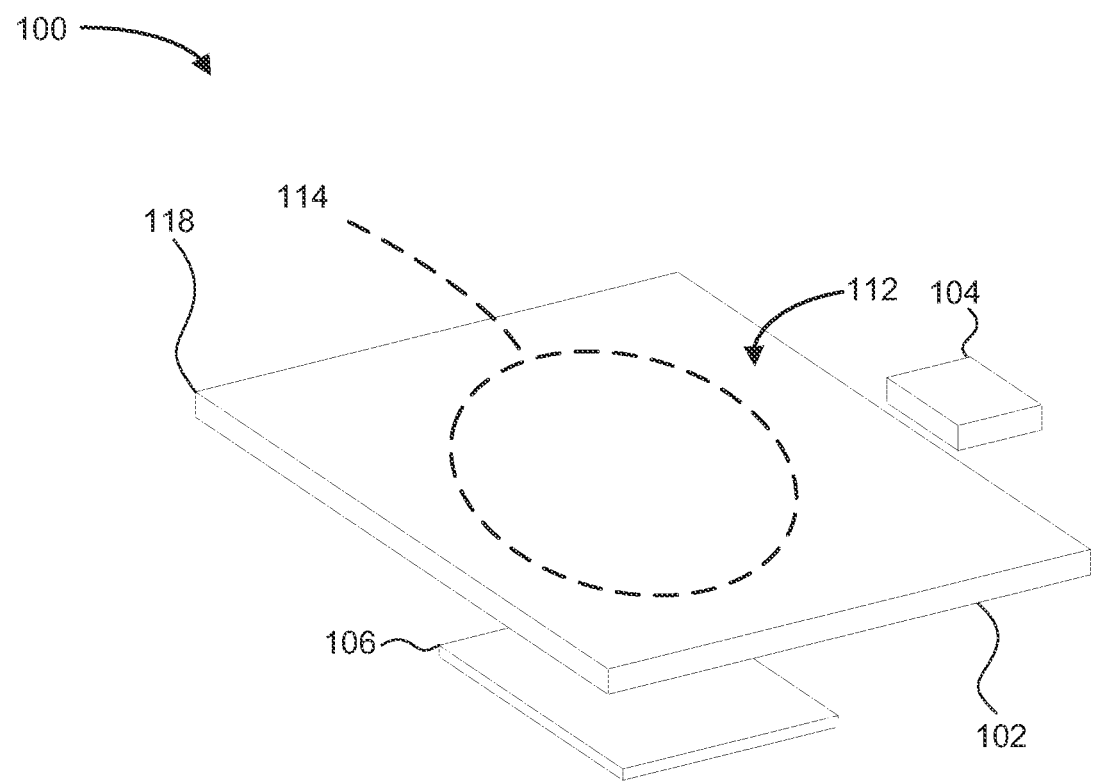
FIG. 1 depicts a perspective view of one embodiment of a user input device in the form of an optical finger navigation device.

FIG. 1 depicts a perspective view of one embodiment of a user input device in the form of an optical finger navigation device 100. The optical finger navigation device 100 includes a light guide film (LGF) 102, one or more light source(s) 104, and a sensor 106. Although the optical finger navigation device 100 is shown and described with certain components and functionality, other embodiments may be implemented with fewer or more components to facilitate less or more functionality.

In some embodiments, the LGF 102 is constructed of a light transmissive material film. The LGF 102 is flexible in certain embodiments, and may be curved when installed into an electronic device to facilitate mechanical placement of the components in space available positions. The LGF 102 may be bent and still maintain desired optical properties due to total internal reflection (TIR) of the light generated at the light source 104. In other embodiments, the LGF 102 is substantially planar. Even though the LGF 102 may have a curved geometry, the optical characteristics of the LGF 102 are nevertheless similar to a planar geometry with respect to the TIR of the light within the LGF 102. In some embodiments, the LGF 102 may have a polished surface to further facilitate the TIR. Additionally, a reflective coating may be applied to the surface of the LGF 102.

The LGF 102, in some embodiments, is generally substantially thinner than a traditional light guide (e.g., a molded plastic light guide). Traditional light guides are typically on the order of several millimeters thick. In a traditional thick light guide, the rays undergo a minimum number of reflections from interfaces before the light exits the thick light guide. In contrast, in the thin film type light guide there is a high number of internal reflections from the interfaces. Hence the interaction with the finger in contact is greatly increased. The LGF 102, in one embodiment, is between about 10 and about 100 microns thick. In another embodiment, the LGF 102 is about 50 microns thick.

The LGF 102 is formed using thin film plastic manufacturing techniques, such as deposition, cast film extrusion, or embossing, in certain embodiments, which results in a thinner product than can be produced using the techniques used to form traditional light guides, such as injection molding. Since the LGF 102 is substantially thinner than a traditional light guide and provides efficient, high brightness area illumination, the overall thickness of the optical finger navigation device 100 is reduced.

The LGF 102 includes a major surface 112. In the illustrated embodiment, the major surface 112 is the top surface of the LGF 102. As depicted, the major surface 112 includes a portion that is substantially planar. The major surface 112 also may include the top surface of a curved portion of an LGF 102.

The LGF 102 also includes a finger interface surface 114. More specifically, a portion of the major surface 112 is designated as the finger interface surface 114. The finger interface surface 114 is generally the portion of the major surface 112 at which a finger (not shown) contacts the LGF 102. In some embodiments, the finger interface surface 114 is circular. Alternatively, the finger interface surface 114 is non-circular.

The finger interface surface 114 facilitates user contact with the LGF 102. Contact of, for example, a user's finger with the finger interface surface 114 causes light that would otherwise be reflected by TIR to at least partially exit the light guide where the finger contacts the LGF 102. Some of the light that exits the LGF reflects off of the finger and is directed back to the sensor 106. The sensor 106 detects a change in light intensity as a result of this reflected light. In some embodiments, non-planar elements (not shown) enhance the amount of light scattered from a finger by increasing the amount of light that exits the LGF 102 at the finger interface surface 114. Non-planar elements are described in greater detail in relation to FIGS. 4A, 4B, and 5. Since the finger contact may be monitored and finger movements may be calculated, the finger contact with the finger interface surface 114 facilitates a user input at the LGF 102.

Figure 2A:
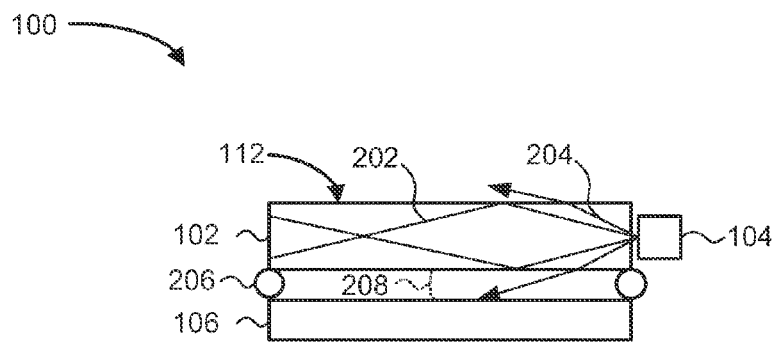
FIG. 2A depicts a cross-sectional diagram of one embodiment of the optical finger navigation device of FIG. 1.

FIG. 2A depicts a cross-sectional diagram of one embodiment of the optical finger navigation device 100 of FIG. 1. The optical finger navigation device 100 includes the LGF 102, the light source 104, the sensor 106, and one or more spacers 206. The LGF 102 includes the major surface 112. The light source 104 directs light into the LGF 102. In an embodiment, the light source 104 is configured to inject light in to an edge surface of the LGF 102. For example, light from the light source 104 is incident on a side edge 105 of the LGF 102. The LGF 102 reflects the light internally through TIR depending on the angle of incidence of the light and the relative indices of refraction of material on either side of a boundary of the LGF 102. A low angle ray of light 202 and a high angle ray of light 204 are also depicted. "Low" and "high" as used in relation to angles of light in this document refer to the relative angle of the rays of light from the surface of the LGF 102, rather than an angle from the normal of the surface of the LGF 102.

In some embodiments, a low angle ray of light 202 is totally internally reflected as it encounters a boundary between the LGF 102 and the surrounding environment. A high angle ray of light 204, however, may escape from the LGF 102 at the boundary between the LGF 102 and the surrounding environment. The high angle ray of light 204 may be detected by the sensor 106 and/or interact with a finger.

The spacer 206, in one embodiment, is located between the LGF 102 and the sensor 106. The spacer 206 holds the sensor 106 a fixed distance from the LGF 102. By maintaining a separation between the sensor 106 and the LGF 102, the spacer creates a gap 208. The gap 208 may contain the fluid found in the surrounding environment, such as air, or may contain a separate fluid, such as an inert gas. In some environments, the gap 208 maintains a vacuum or a relatively low density fluid. In certain embodiments, the spacer 206 is one or more spherical elements.

Figure 2B:
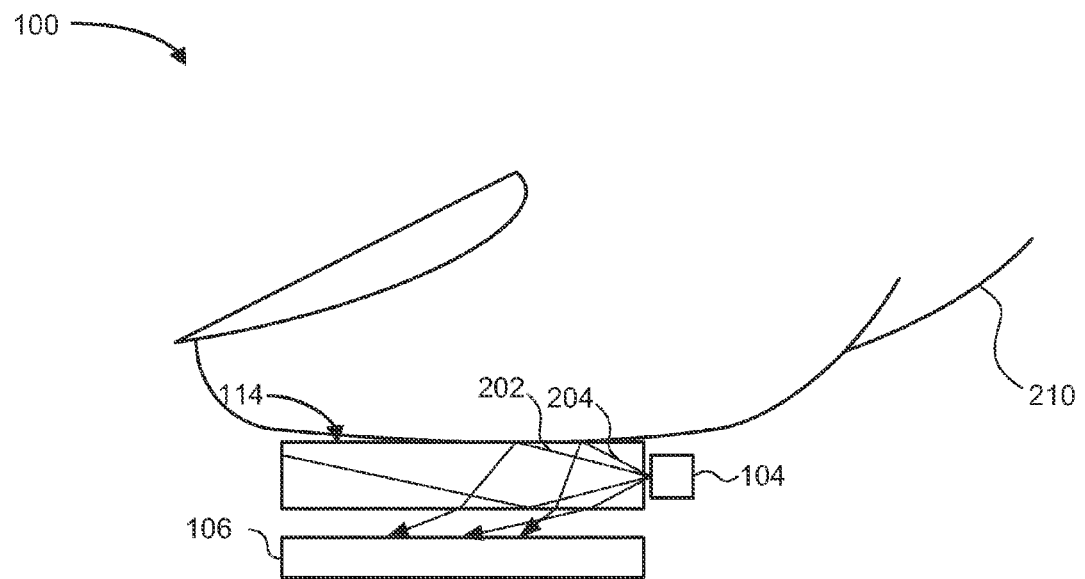
FIG. 2B depicts a cross-sectional diagram of one embodiment of the optical finger navigation device of FIG. 1 with a finger positioned relative to a light guide film (LGF) to modify the total internal reflection of the LGF.

FIG. 2B depicts a cross-sectional diagram of one embodiment of the optical finger navigation device 100 of FIG. 1 with a finger 210 positioned relative to the LGF 102 to modify the TIR of the LGF 102. In the illustrated embodiment, the finger 210 physically contacts the finger interface surface 114 of the LGF 102 and modifies the TIR of the light reflected within the LGF 102. The physical contact between the finger 210 and the LGF 102 modifies the TIR and at least partially scatters light out of the LGF 102. The change in the surface function due to the refractive index change from LGF 102 to the surrounding environment to LGF 102 to finger results in a change in the optical function (scattering and absorption) which is detected by the imagers. In some embodiments, the finger 210 has an index of refraction relatively closer to the index of refraction of the LGF 102 than that of air. As a result, a low angle ray of light 202, which would totally internally reflect off of the LGF-environment boundary, is instead at least partially scattered by the finger 210, changing the light pattern detected by the sensor 106. Furthermore, the high angle ray of light 204, which would escape to the environment in a direction away from the sensor 106 in the absence of the finger 210, may be reflected by the finger toward the sensor 106, changing the light pattern detected by the sensor 106. In certain embodiments, light reflects off the finger 210 and reaches the sensor 106 that would not otherwise reach the sensor 106. Light reflected off the finger 210 to the sensor 106 changes the light pattern detected by the sensor 106

Figure 3A:
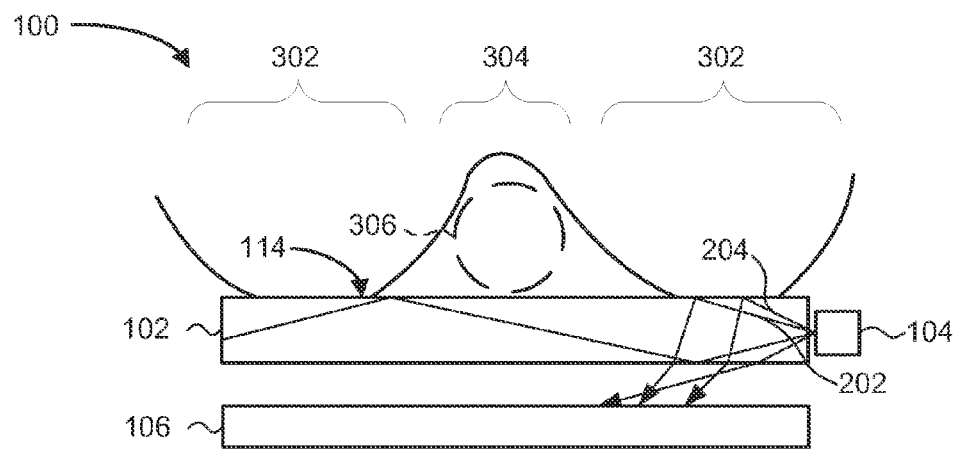
FIG. 3A depicts a cross-sectional diagram of one embodiment of the optical finger navigation device of FIG. 1 with fingerprint ridges and a fingerprint valley positioned relative to the LGF to modify the total internal reflection of the LGF.

FIG. 3A through FIG. 5 depict magnified views of cross sections of embodiments of the optical finger navigation device 100 of FIG. 1. FIG. 3A depicts a cross-sectional diagram of one embodiment of the optical finger navigation device 100 of FIG. 1 with fingerprint ridges 302 and a fingerprint valley 304 positioned relative to the LGF 102 to modify the TIR of the LGF 102. A finger 210 includes a plurality of fingerprint ridges 302. Between the fingerprint ridges 302 are fingerprint valleys 304. In certain embodiments, when the finger 210 contacts the finger interface surface 114, the fingerprint ridges 302 are in direct contact with the finger interface surface 114, while small pockets of air 306 are left at the fingerprint valleys 304.

TIR is dependent on relative indices of refraction and angles of incidence, as described above. A high angle ray of light 204, in one embodiment, may be at least partially reflected by a fingerprint ridge 302 if the fingerprint ridge 302 is in contact with the finger interface surface 114 where the high angle ray of light 204 encounters the finger interface surface 114. As a result, the image detected by the sensor 106 is modified by the contact with the fingerprint ridge 302.

A low angle ray of light 202, which would be totally internally reflected at the finger interface surface 114 if the finger was absent, may be scattered if the low angle ray of light 202 encounters the finger interface surface where a fingerprint ridge 302 is located. The scattered light from the low angle ray of light 202 may be scattered toward the sensor 106 and modify the image detected by the sensor 106.

Figure 3B:
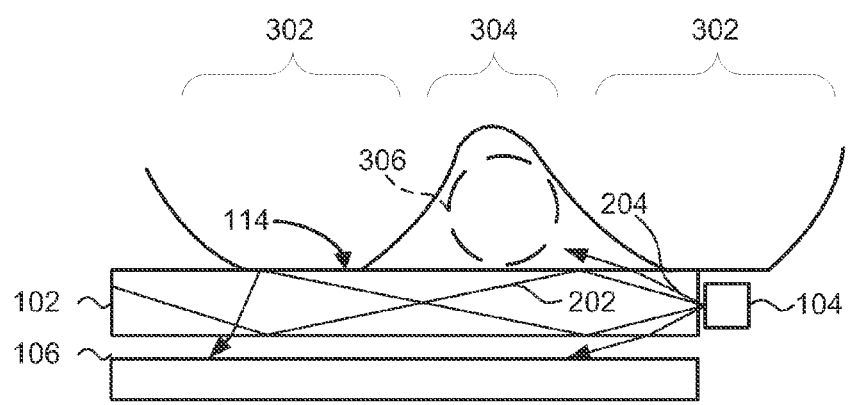
FIG. 3B is another cross-sectional diagram of one embodiment of the optical finger navigation device of FIG. 1 with fingerprint ridges and a fingerprint valley positioned in another position relative to the LGF to modify the total internal reflection of the LGF.

FIG. 3B is another cross-sectional diagram of one embodiment of the optical finger navigation device 100 of FIG. 1 with fingerprint ridges 302 and a fingerprint valley 304 positioned in another position relative to the LGF 102 to modify the TIR of the LGF 102. In the illustrated embodiment, the high angle ray of light 204 intersects the finger interface surface 114 where a fingerprint valley 304 is over the finger interface surface 114. Consequently, the high angle ray of light 204 may at least partially escape from the LGF 102. Similarly, the low angle ray of light 202 intersects the finger interface surface 114 where a fingerprint valley 304 is over the finger interface surface 114. Consequently, the low angle ray of light 202 exhibits TIR at the finger interface surface 114. The change in fingerprint position results in a change in the pattern of TIR of the collective ensemble of rays of light 202, 204. The change in pattern is detected by the sensor 106.

In some embodiments, as a finger 210 moves over the finger interface surface 114, the type and amount of reflection of a high angle ray of light 204 and scattering of low angle ray of light 202 at the finger interface surface 114 may change. When the finger 210 is situated such that a fingerprint ridge 302 is located at the intersection of the high angle ray of light 204 and the finger interface surface (as illustrated in FIG. 3A), the high angle ray of light 204 is at least partially scattered by the fingerprint ridge 302. Similarly, when the finger 210 is situated such that a fingerprint ridge 302 is located at the intersection of the low angle ray of light 202 and the finger interface surface (as illustrated in FIG. 3A), the low angle ray of light 202 is at least partially scattered by the fingerprint ridge 302. When the finger 210 is situated such that a fingerprint valley 304 is located at the intersection of the high angle ray of light 204 and the finger interface surface (as illustrated in FIG. 3B), the high angle ray of light 204 may at least partially escape from the LGF 102. When the finger 210 is situated such that a fingerprint valley 304 is located at the intersection of the low angle ray of light 202 and the finger interface surface (as illustrated in FIG. 3B), the low angle ray of light 202 exhibits TIR. The sensor 106 detects this change as more or less light from the high angle ray of light 204 and the low angle ray of light 202 reaches a location on the sensor 106 as the position of the finger 210 changes.

Figure 4A:
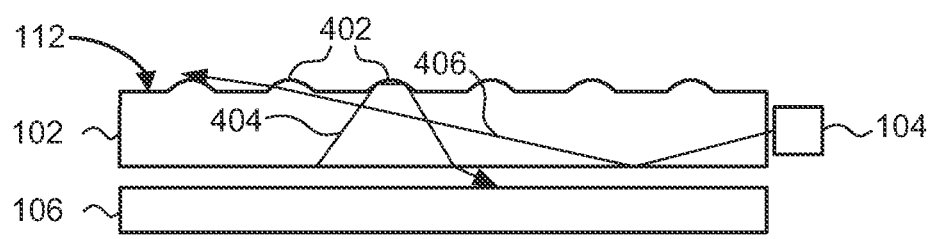
FIG. 4A depicts a cross-sectional diagram of another embodiment of the optical finger navigation device of FIG. 1, which includes non-planar elements on a major surface of the LGF.

FIG. 4A depicts a cross-sectional diagram of another embodiment of the optical finger navigation device 100 of FIG. 1, which includes non-planar elements 402 on the major surface 112 of the LGF 102. The non-planar elements 402, in one embodiment, are out of plane with the major surface 112. In one embodiment, the non-planar elements 402 are distributed uniformly across the finger interface surface 114. In an alternative embodiment, the non-planar elements 402 are distributed non-uniformly across the finger interface surface 114. In certain embodiments, the non-planar elements 402 at least partially protrude beyond the major surface 112. In one embodiment, the non-planar elements 402 comprise bumps on the finger interface surface 114. In an alternative embodiment, the non-planar elements 402 are depressions in the major surface 112. The non-planar elements result in differing angles of incidence for light rays within the LGF 102. The differing angles of incidence result in scattering rays of light that would otherwise be totally internally reflected.

The non-planar elements 402 modify the TIR of the LGF 102 and scatter light from the light source 104. In one embodiment, the non-planar elements 402 scatter the light from the light source 104 such that at least some light is directed into the sensor 106. In some embodiments, the non-planar elements 402 scatter the light from the light source 104 such that at least some of the light is directed away from the sensor 106. For example, a low angle ray of light 406 which would be totally internally reflected by the major surface 112 may at least partially exit the LGF 102 in a direction away from the sensor 106 when the light impacts a non-planar element 402. Light scattered away from the sensor 106 by the non-planar elements 402 may serve to illuminate the finger interface surface 114. The light scattered away from the sensor 106 by the non-planar elements 402 may also interact with a finger 210 and be reflected back to the sensor 106. The effect of these interactions caused by the non-planar elements 402 is to increase the signal detected by the sensor 106.

The sensor 106, in one embodiment, generates an image from the light directed into the sensor 106. Light scattered by the non-planar elements 402 toward the sensor 106 is represented in the static image generated by the sensor 106. In certain embodiments, changes to the images generated by the sensor 106 are interpreted as movement by a finger 210 on the finger interface surface 114.

The action of the non-planar elements 402 is to increase the brightness and complexity of the scattering and absorption of the finger ridges and valleys over the sensor 106 versus a planar TIR waveguide with no non-planar elements. This increase in brightness enhances the ability to detect motion. Non-planar elements have a high to low (e.g., LGF-to-air) index change. In one embodiment, air bubbles or nanospheres may be induced into the area 114 of the LGF film with a high index change as another means to increase the local static scattering. However, bumps may be preferred in some embodiments because the bumps change the most in response to a finger.

Figure 4B:
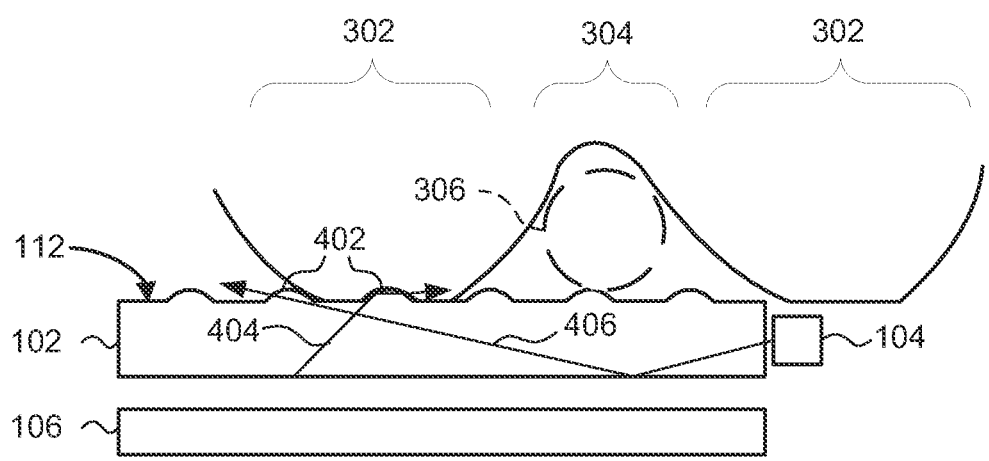
FIG. 4B depicts the cross-sectional diagram of FIG. 4A relative to fingerprint ridges and a fingerprint valley of a finger.

FIG. 4B depicts the cross-sectional diagram of FIG. 4A relative to fingerprint ridges 302 and a fingerprint valley 304 of a finger. In certain embodiments, when the finger 210 contacts the finger interface surface 114, the fingerprint ridges 302 are in direct contact with one or more non-planar elements 402, while small pockets of air are left at the fingerprint valleys 304. Fingerprint ridges 302 in contact with non-planar elements 402 modify the internal reflection of light within the LGF 102. For example, the high angle ray of light 404 that impacts non-planar element 402 is totally internally reflected when air is adjacent to the non-planar element 402 as is the case in FIG. 4A. If, instead, a fingerprint ridge 302 is adjacent to the non-planar element 402 as is the case in FIG. 4B, the high angle ray of light 404 at least partially exits the LGF 102. This change in internal reflection is due at least in part to a difference between the indices of refraction of air and the fingerprint ridge 302. The change in the internal reflection of a particular ray of light modifies the light entering the sensor 106. Consequently, the image generated by the sensor 106 also changes. The optical finger navigation device 100, in one embodiment, interprets the changes in generated images as movement by a finger 210 across the finger interface surface 114.

Figure 5:
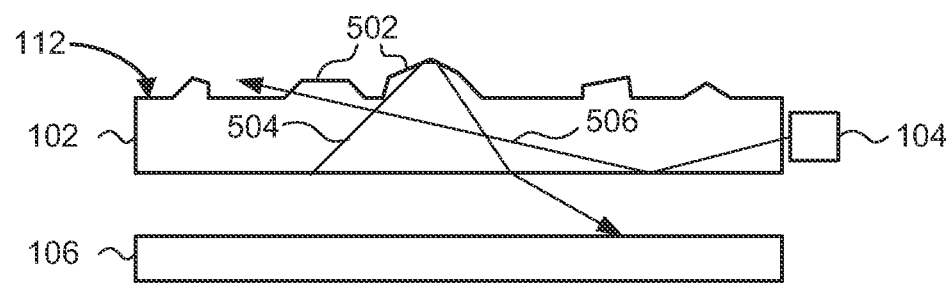
FIG. 5 depicts a cross-sectional diagram of another embodiment of the optical finger navigation device of FIG. 1 including irregular non-planar elements.

FIG. 5 depicts a cross-sectional diagram of another embodiment of the optical finger navigation device 100 of FIG. 1 including prism shapes or irregular non-planar elements 502. The irregular non-planar elements 502 may take any shape. In some embodiments, the irregular non-planar elements 502 may appear to be random shapes. For example, the irregular non-planar elements 502 may be an arbitrary texture formed on the finger interface surface 114. The irregular non-planar elements 502 are uniformly distributed across the finger interface surface 114. In another embodiment, the irregular non-planar elements 502 are not distributed uniformly across the finger interface surface 114. In some embodiments, the irregular non-planar elements 502 may consist of environmental elements, such as dust or oil on the surface of the finger interface surface 114. In the embodiment of FIG. 5, the non-planar elements 502 protrude above the major surface 112 of the LGF 102. In other embodiments, as described below, non-planar elements are configured as recessed areas that extend below the major surface 112 of the LGF 102.

The irregular non-planar elements 502 modify the internal reflection of light within the LGF 102. The irregular non-planar elements 502, in some embodiments, scatter at least some light out of the LGF 102. Light scattered toward the sensor 106 is detected by the sensor 106. Light scattered away from the sensor 106 may illuminate the finger interface surface 114 and may interact with a finger 210.

The irregular non-planar elements 502, in one embodiment, interact with fingerprint ridges 302 and fingerprint valleys 304 in a similar manner to the other non-planar elements 402 as described above in relation to FIG. 4B. For example, a fingerprint ridge 302 in contact with an irregular non-planar element 502 may absorb at least some light that would otherwise be scattered toward the sensor 106, resulting in a change to the light detected by the sensor 106.

Figure 6:
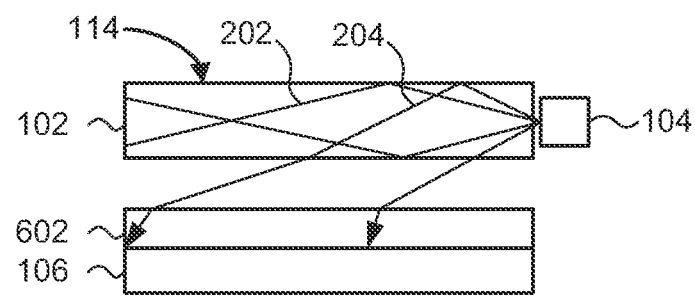
FIG. 6 depicts a cross-sectional diagram of another embodiment of the optical finger navigation device of FIG. 1 including an encapsulant.

FIG. 6 depicts a cross-sectional diagram of another embodiment of the optical finger navigation device 100 of FIG. 1 including an encapsulant 602. The encapsulant 602, in one embodiment, covers the sensor 106 and provides protection to the sensor 106. In certain embodiments, the encapsulant 602 is a light transmissive material allowing light from the LGF 102 to pass through the encapsulant 602 to the sensor 106. In certain embodiments, the encapsulant 602 is formed with optical characteristics that allow it to act as a lens. The lens formed by the encapsulant 602 may be a refractive element or a Fresnel lens. In another embodiment, the encapsulant 602 is attached to the bottom of the LGF 102, rather than to the top of the sensor 106. In particular, the encapsulant 602 may be aligned with the finger contact area 114. Thus, the exact location of the encapsulant 602 may vary from one embodiment to another, as long as there is an air gap (or another low-index layer such as aerogel) at some place in the stack up between the sensor 106 and the LGF 102.

Figure 7:
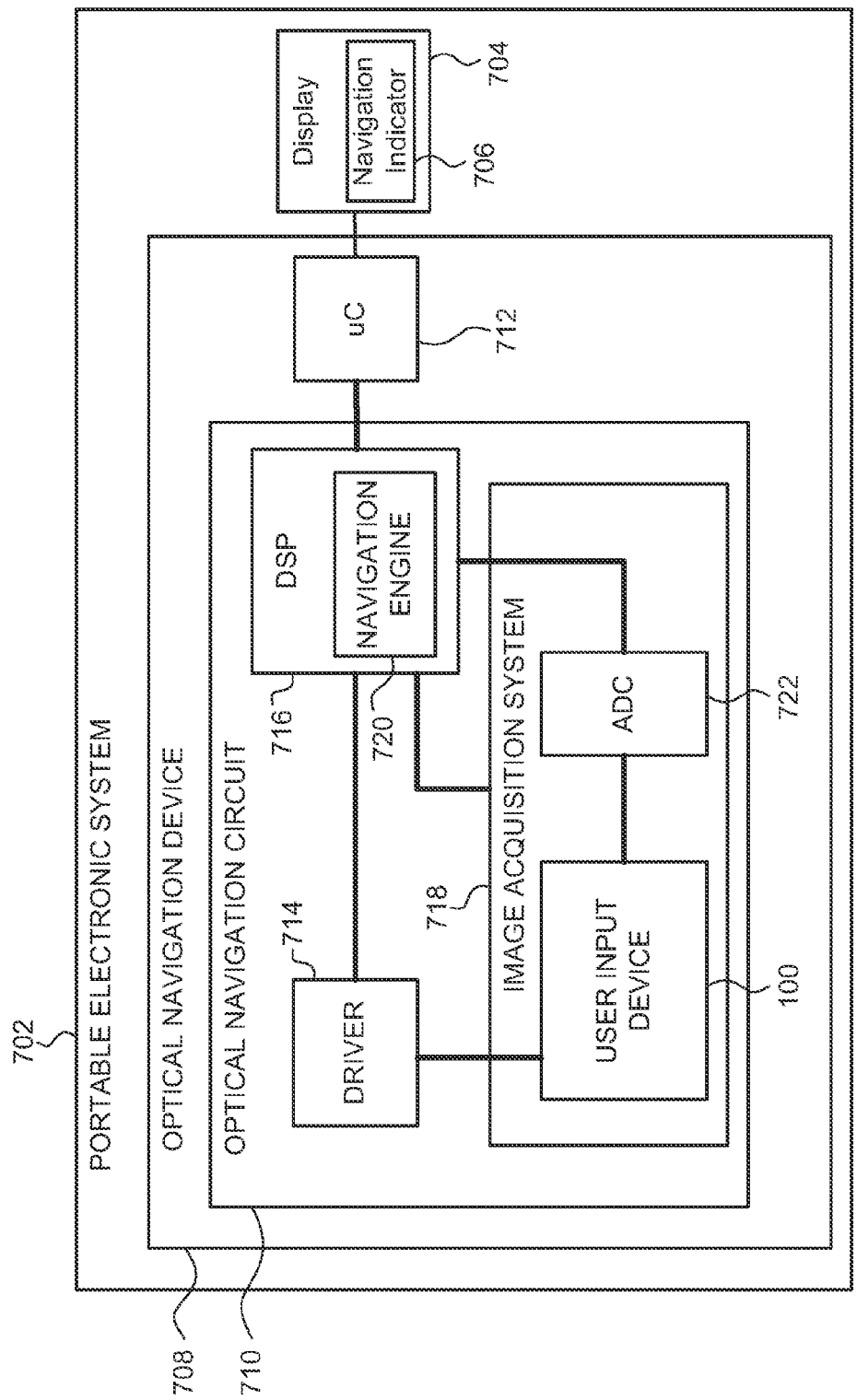
FIG. 7 depicts a block diagram of one embodiment of a portable electronic system with optical finger navigation.

FIG. 7 depicts a block diagram of one embodiment of a portable electronic system 702 with optical finger navigation. The portable electronic system 702 implements the user input device 100 (e.g., the optical finger navigation device 100 of FIG. 1) to facilitate user input. Examples of portable electronic systems 702 which may implement embodiments of the user input device 100 include handheld communications devices such as cellular telephones and global positioning system (GPS) devices. Additionally, other types of electronic peripherals such as personal music players, personal digital assistants (PDAs), bio-metric finger print sensors, smartphones, tablet computers, and so forth may be implemented within embodiments of the portable electronic system 702.

By implementing an embodiment of the user input device 100 in the portable electronic system 702, the user input device 100 may facilitate, for example, user input to navigate content on a display device 141 of the user input device 100.

For example, the user input device 100 may facilitate control of a navigation indicator 706 on the display device 704. The navigation indicator 706 may be a cursor, a highlighter, an arrow, or another type of navigation indicator. Additionally, the user input received through the user input device 100 may facilitate other types of user-controlled functionality including, but not limited to, volume controls, audio playback selections, browser controls, bio-metric identification, electronic musical instruments, actions in games, and so forth. The types of user-controlled functionality that may be implemented with embodiments of the user input device 100 may depend on the type of functionality generally provided by the portable electronic system 702. Also, although FIG. 7 specifically illustrates a portable electronic system 702, other embodiments may implement the user input device 100 in electronic devices which are portable, but not necessarily held in a user's hand, or devices which are generally considered to be not portable.

The portable electronic system 702 includes an optical navigation device 708. Although the optical navigation device 708 is shown with certain components and described herein as implementing certain functionality, other embodiments of the optical navigation device 708 may include fewer or more components to implement less or more functionality.

The illustrated optical navigation device 708 includes an optical navigation circuit 710 and a microcontroller (uC) 712. In general, the optical navigation circuit 710 generates signals representative of finger or other navigation movement at the user input device 100. The optical navigation circuit 710 then transmits one or more signals to the microcontroller 712. Exemplary types of signals transmitted from the optical navigation circuit 710 to the microcontroller 712 include channel quadrature signals based on ΔX and ΔY relative displacement values. The ΔX and ΔY displacement values may represent a specific pattern for finger print identification or a vector of displacement, direction, and magnitude. These signals, or other signals, may be indicative of a relative movement between the finger and the user input device 100. Other embodiments of the optical navigation circuit 710 may transmit other types of signals to the microcontroller 712. In some embodiments, the microcontroller 712 implements a variety of functions, including transmitting data to and receiving data from a host computer system or other electronic device (not shown) or acting on the displacement values.

In order to generate the navigation signals, the depicted optical navigation circuit 710 includes a driver 714, a digital signal processor (DSP) 716, and an image acquisition system (IAS) 718. The image acquisition system 718 includes the user input device 100 and an analog-to-digital converter (ADC) 722. Other embodiments of the optical navigation circuit 710 and or the image acquisition system 718 may include fewer or more components to implement less or more functionality.

In one embodiment, the driver 714 of the optical navigation circuit 710 controls the operation of the light source 104 to generate the light signal that is transmitted to the finger interface surface 114. The driver 714 may control the light source 104 to several different brightness levels, or the driver 714 may pulse the light source 104 in conjunction with sending detector on/off signals to the sensor 106, thereby increasing the system response function for desirable goals. The reflected light signal is then received and detected by the sensor 106 of the user input device 100, as described above.

In one embodiment, the user input device 100 generates one or more analog electrical signals corresponding to incident light on the sensor 106. The user input device 100 then transmits the analog signals to the analog-to-digital converter 722. The analog-to-digital converter 722 converts the electrical signals from analog signals to digital signals and then passes the digital signals to the digital signal processor 716.

After the digital signal processor 716 receives the digital form of the signals from the analog-to-digital converter 722 of the image acquisition system 718, the digital signal processor 716 may perform additional processing using the electrical signals. The digital signal processor 716 then transmits one or more signals to the microcontroller 712, as described above. In some embodiments, the digital signal processor 716 includes a navigation engine 720 to generate lateral movement information based on lateral movement of the finger relative to the finger interface surface 114. Other embodiments of the navigation engine 720 may generate other types of movement information.

More specifically, in one embodiment, the sensor 106 of the user input device 100 includes an array of distinct photodetectors (not shown), for example, a 16×16 or 32×32 array of distinct photodetectors configured to detect light that is reflected from the illuminated spot on the finger interface surface 114. Each of the photodetectors in the sensor 106 generates light intensity information that is output as a digital value (e.g., an 8-bit digital value). Image information is captured by the sensor 106 in frames, where a frame of image information includes a set of simultaneously captured values for each distinct photodetector in the sensor 106. The rate of image frame capture and tracking resolution can be programmable. In an embodiment, the image frame capture rate ranges up to 2,300 frames per second with a resolution of 800 counts per inch (CPI). Although some examples of frame capture rates and resolutions are provided, different frame capture rates and resolutions are contemplated.

The navigation engine 720 compares successive image frames from the sensor 106 to determine the movement of image features between frames. In particular, the navigation engine 720 determines movement by correlating common features that exist in successive image frames from the sensor 106. The movement between image frames is expressed in terms of movement vectors in, for example, X and Y directions (e.g., ΔX and ΔY). The movement vectors are then used to determine the movement of the input device 100 relative to the navigation surface. More detailed descriptions of examples of navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

Figure 8:
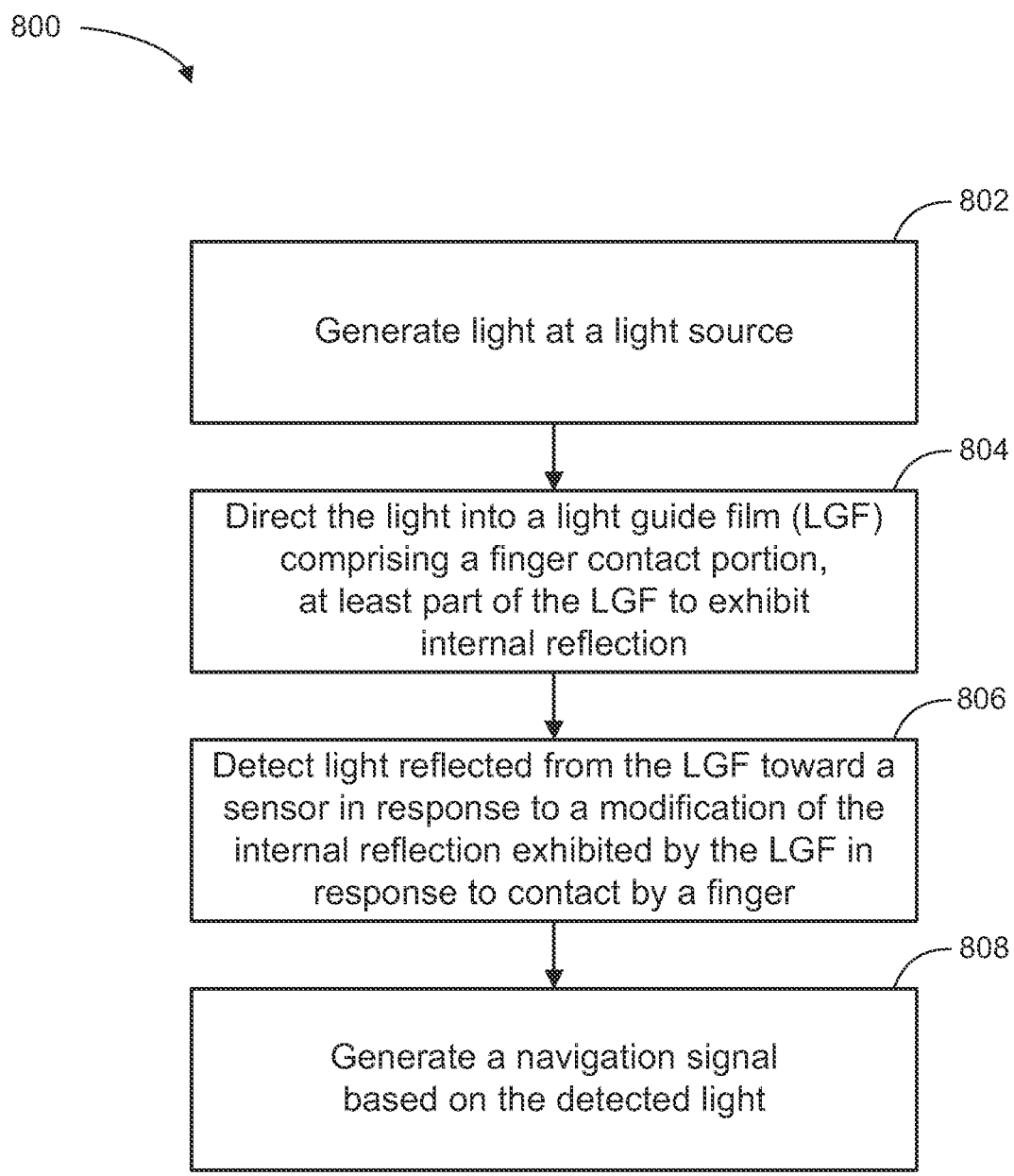
FIG. 8 is a flow chart diagram depicting one embodiment of a method for optical finger navigation using an LGF.

FIG. 8 is a flow chart diagram depicting one embodiment of a method 800 for optical finger navigation using an LGF. Although specific reference is made to the optical finger navigation device 100, some embodiments of the method 800 may be implemented in conjunction with other optical finger navigation systems or user input devices.

At block 802, the light source 104 generates light. The light source 104 may be a light-emitting diode (LED) or a laser, although many other types of light sources may be implemented. At block 804, the light illuminates the LGF 102, which has a finger interface surface 114, as described above. The LGF 102 at least partially exhibits TIR.

At block 806, the sensor 106 detects light reflected from the LGF 102 toward the sensor 106. The sensor 106 detects a different light pattern in response to a modification of the internal reflection exhibited by the LGF 102 in response to contact by a finger 210. In some embodiments, the sensor 106 detects modifications to the light pattern caused by the interaction of one or more fingerprint ridges 302 and fingerprint valleys 304 with the finger interface surface 114. In certain embodiments, the sensor 106 detects modifications to the light pattern caused by interactions between one or more non-planar elements 402 and the finger 210. At block 808, the sensor 106 generates a navigation signal based on the detected light.

Figure 9:
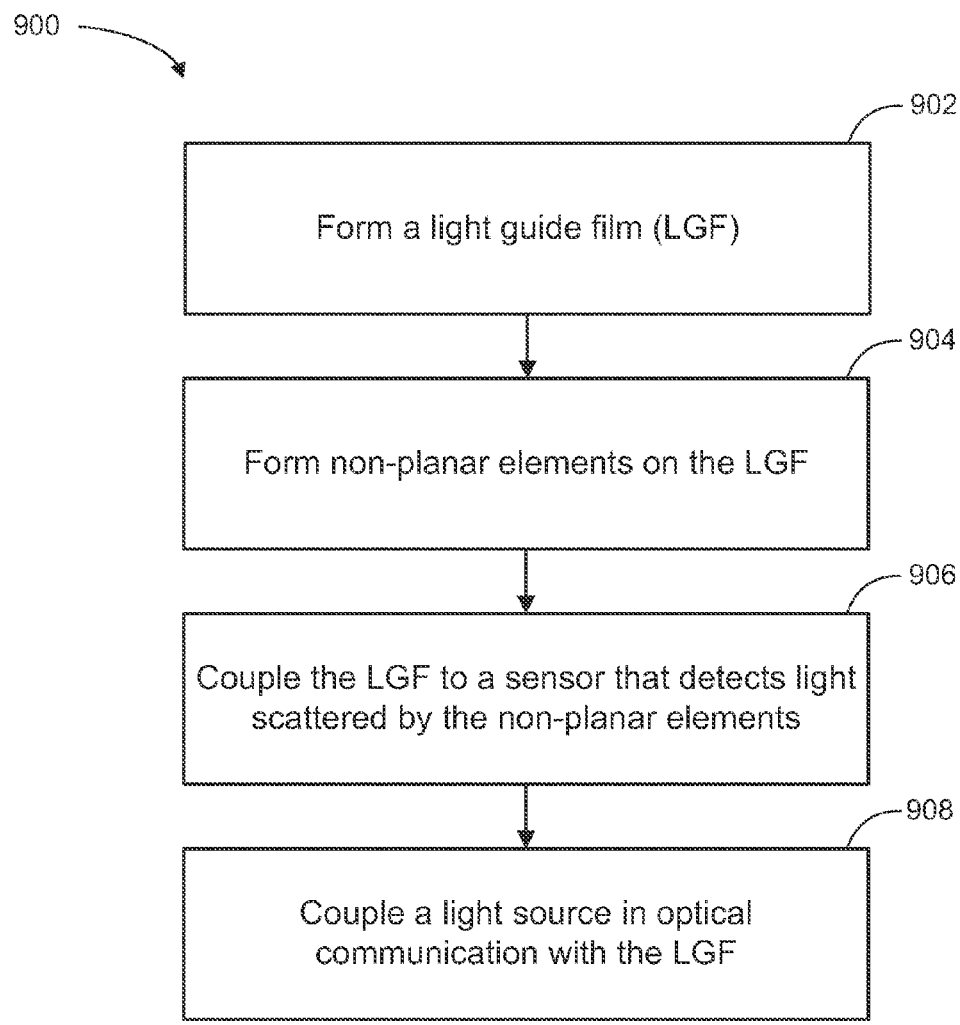
FIG. 9 is a flow chart diagram depicting one embodiment of a method for manufacturing an optical finger navigation device using an LGF.

FIG. 9 is a flow chart diagram depicting one embodiment of a method 900 for manufacturing an optical finger navigation device 100 using an LGF 102. Although specific reference is made to the optical finger navigation device 100, some embodiments of the method 900 may be implemented in conjunction with other optical finger navigation systems or user input devices.

At block 902, an LGF 102 is formed. The LGF 102 may be formed using any process, including, but not limited to, roll to roll extrusion, physical deposition, chemical deposition, and melt spinning The specific type of formation process used may depend on the intended functionality of the LGF 102. For example, the formation processes used to make an LGF for commercial lighting purposes may be different from the formation processes used to make an LGF for illuminating key labels in cell phones. At block 904, non-planar elements 402 are formed on the LGF 102. In some embodiments, the non-planar elements 402 at least partially protrude beyond a major surface 112 of the LGF 102. In an alternative embodiment, the non-planar elements 402 include depressions that extend below the major surface 112 of the LGF 102. The non-planar elements 402 may be formed using any method, including, but not limited to, embossing, layering, nano-imprinting, molding, etching, printing, bonding, and spraying. In some embodiments, the non-planar elements 402 can be incorporated into the bulk film in the finger area 114 provided the same optical function occurs as described with elements 402. For example, in some embodiments nanospheres (e.g., small air bubbles or sapphire spheres) may be formed within the LGF 102. A large change in index occurs between the nanosphere (not shown) and the LGF 102 such that an increased but static scattering of the light rays occurs. As a result, a finger will induce a change in the scattered intensity.

At block 906, the LGF 102 is coupled to a sensor 106 that detects light scattered by the non-planar elements 402. In one embodiment, the LGF 102 is coupled to the sensor 106 by bonding, for example, using a low index adhesive. In another embodiment, the LGF 102 is coupled to the sensor 106 with a low index encapsulant 602 between the LGF 102 and the sensor 106. In some embodiments, the LGF 102 is coupled to the sensor 106 through a spacer 206.

At block 908, a light source 104 is coupled in optical communication with the LGF 102. The light source 104 may be coupled with the LGF 102 in any way that allows light to travel from the light source 104 to enter the LGF 102.

Certain embodiments of a user input device 100 have been described with reference to FIGS. 1-9. Another embodiment, in which the user input device is packaged on a circuit board substrate, is described with reference to FIGS. 10-16. In particular, FIGS. 10-12 illustrate certain steps in an assembly process of an optical finger navigation device and FIGS. 13-16 depict expanded side and top views of certain details of the optical finger navigation device of FIGS. 10-12.

Figure 10:
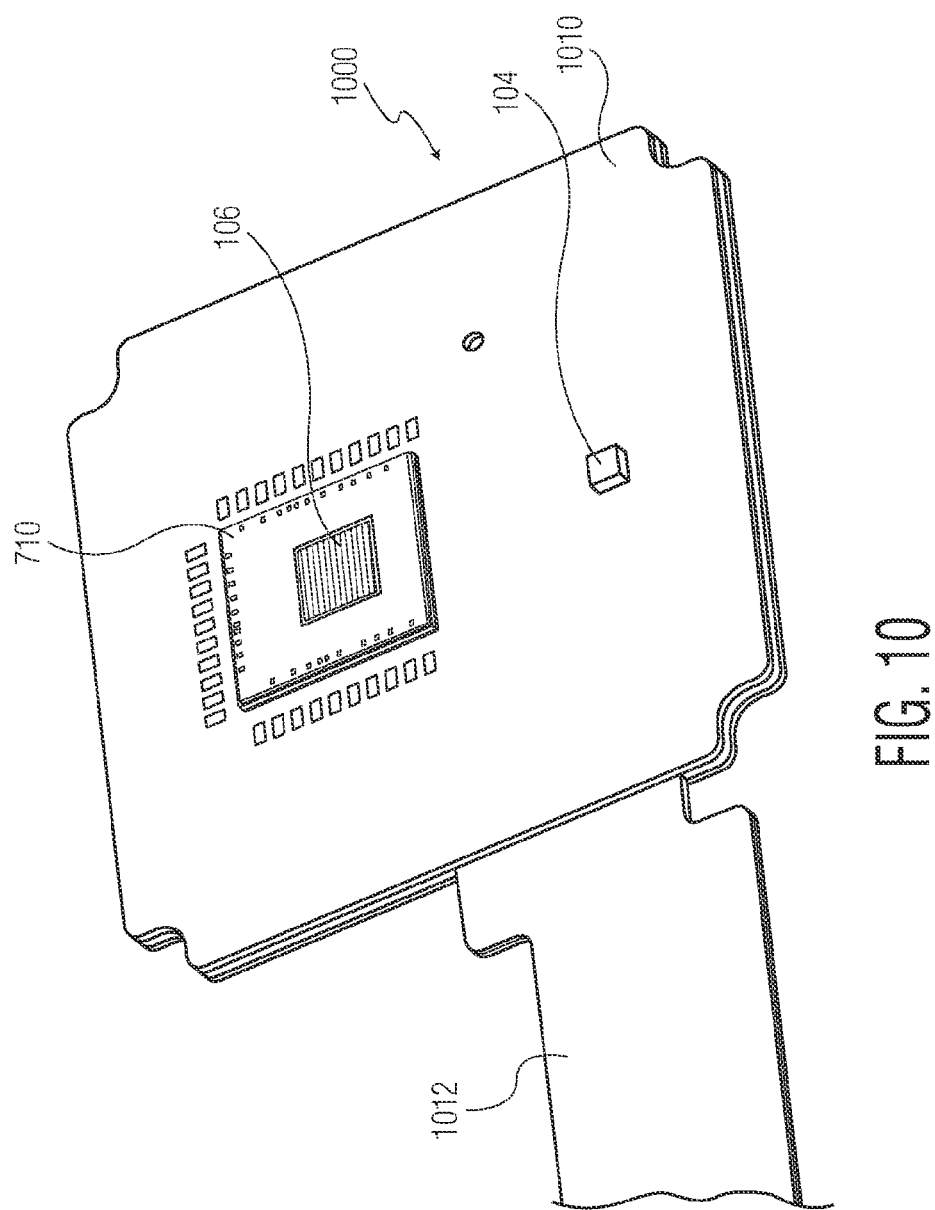
FIG. 10 is a perspective view of a partially assembled optical finger navigation device that includes a circuit board substrate, a sensor, and a light source, where the sensor and the light source are similar to those described above with reference to FIGS. 1-9.

FIG. 10 is a perspective view of a partially assembled optical finger navigation device 1000 that includes a circuit board substrate 1010, a sensor 106, and a light source 104, where the sensor and the light source are similar to those described above with reference to FIGS. 1-9. In the embodiment of FIG. 10, the circuit board substrate is a rigid multi-layer substrate as is known in the field. Electrical conductive paths (not shown) extend from conductive pads on the circuit board substrate to a flexible circuit board substrate 1012. The flexible circuit board substrate provides conductive paths and conductive pads that enable the optical finger navigation device to be electrically connected to a portable electronic system (such as portable electronic system 702) in which the optical finger navigation device resides. In the embodiment of FIG. 10, the optical navigation circuit 710, which includes the sensor 106, and the light source 104 are attached to the circuit board substrate at designated die attach locations. The optical navigation circuit and the light source may be electrically connected to the circuit board substrate using Through Silicon Vias (TSV), although other electrical connection techniques can be used. Once the optical navigation circuit and the light source are attached to the circuit board substrate, the LGF is attached to the circuit board substrate.

Figure 11:
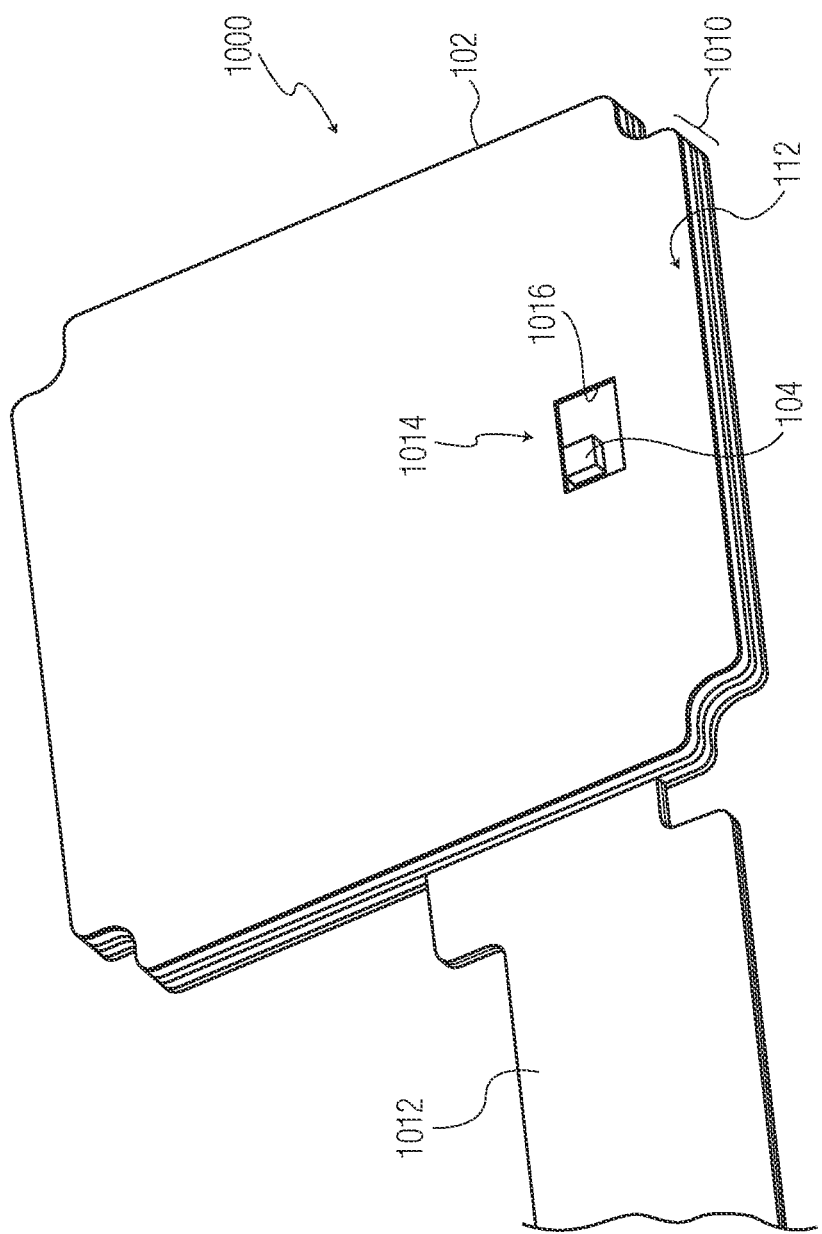
FIG. 11 is a perspective view of the optical finger navigation device after the LGF has been attached to the circuit board substrate.

FIG. 11 is a perspective view of the optical finger navigation device 1000 after the LGF 102 has been attached to the circuit board substrate 1010. In the embodiment of FIG. 11, the LGF is laminated on to the top major surface of the circuit board substrate. For example, the LGF is laminated on to the circuit board substrate using a glue that has a lower index of refraction than the LGF. The glue should have a lower index of refraction than the LGF so that TIR is maintained within the LGF. In alternative embodiments, a gap may be maintained between the LGF and the circuit board substrate, with the gap containing a fluid, such as air, that has a lower index of refraction than the LGF. As illustrated in FIG. 11, the major surface 112 of the LGF is a planar surface that is parallel to the circuit board substrate and to the plane of the sensor 106. The LGF is also configured with a hole 1014 that corresponds to the location of the light source 104. The hole is formed by a side edge 1016 of the LGF and in the embodiment of FIG. 11, the side edge of the LGF is perpendicular to the major surface of the LGF, although other configurations of the side edge are possible. The hole in the LGF and the location of the light source enables light from the light source to be injected into the LGF through the side edge of the LGF. Although the light source is located in a hole within the LGF, in other embodiments, the LGF does not include a hole and the light source is located at a side edge of the LGF that makes up the outer perimeter of the LGF. Other configurations of the LGF and the light source are possible as long as the light is injected in to the LGF at an angle that promotes TIR. Once the LGF is attached to the optical finger navigation device, a cosmetic cover can be attached to the device.

Figure 12:
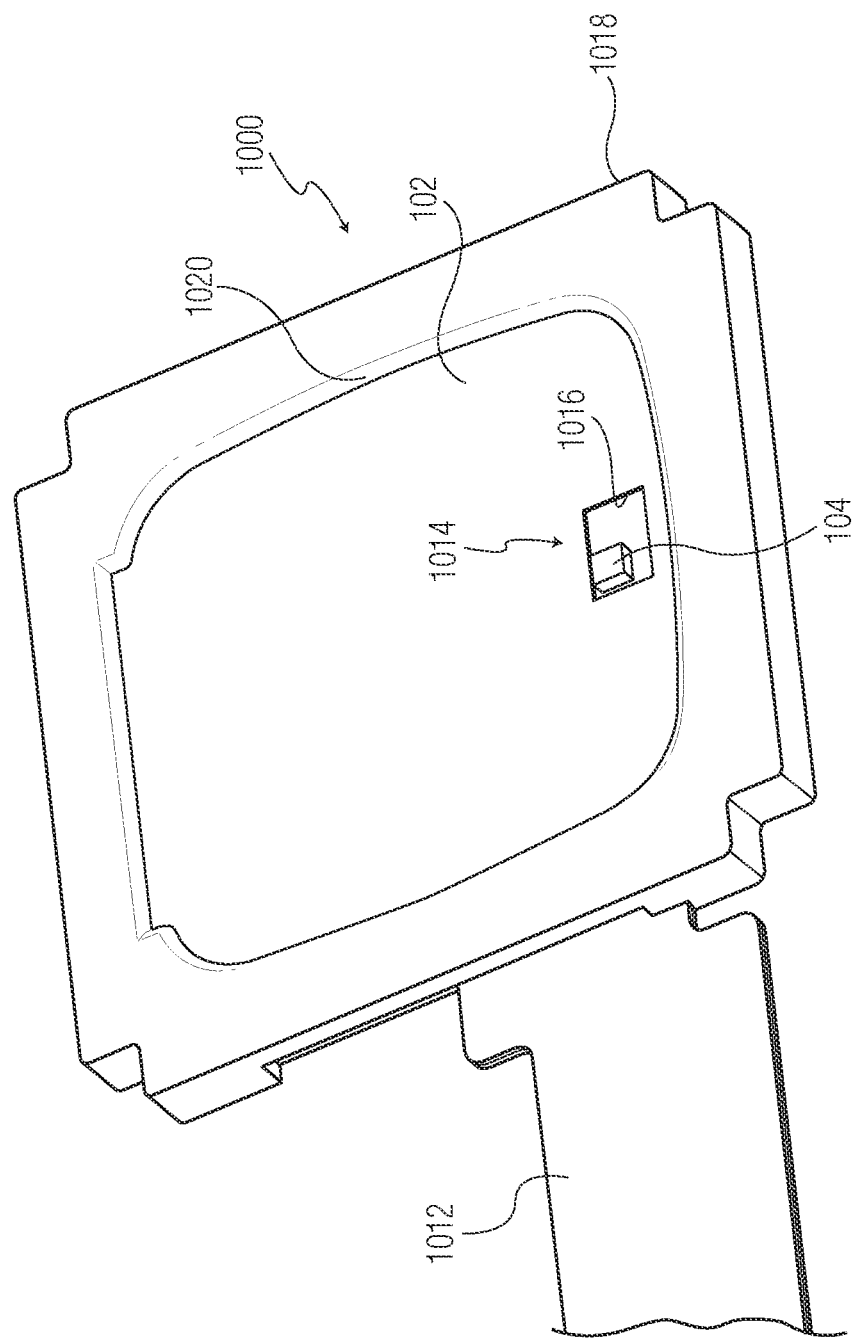
FIG. 12 is a perspective view of the optical finger navigation device after a cosmetic cover has been attached.

FIG. 12 is a perspective view of the optical finger navigation device 1000 after a cosmetic cover 1018 has been attached. In the embodiment of FIG. 12, the cosmetic cover is a plastic molded casing that covers the outer edges of the circuit board substrate 1010 but leaves a portion of the LGF 102 exposed. The exposed portion of the LGF corresponds at least to the location of the sensor so that a user of the optical finger navigation device can place a finger over the location of the sensor. In the embodiment of FIG. 12, the cosmetic cover has a raised perimeter 1020 that provides tactile feedback to the user of the device. The tactile feedback gives the user of the device a tactile indication of the ideal location of the user's finger. In particular, the ridges of the cosmetic cover guide the user's finger to the proper location on the optical navigation device. Other embodiments of the cosmetic cover are possible, including embodiments that do not provide tactile feedback. The cosmetic cover can be configured to conform to the design requirements of the particular electronic system in which the device is to be installed. In an embodiment, the optical finger navigation device shown in FIG. 12 can be installed into a handheld electronic communications device such as a smartphone.

Figure 13:
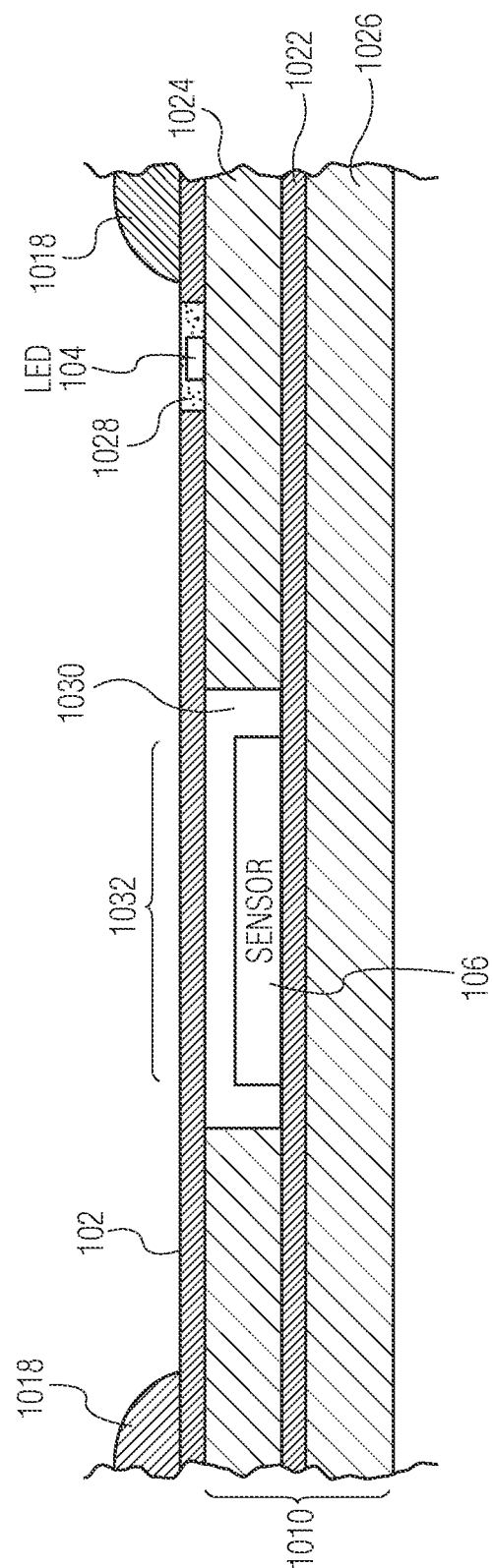
FIG. 13 is a side cutaway view of the optical finger navigation device of FIG. 12.

FIG. 13 is a side cutaway view of the optical finger navigation device 1000 of FIG. 12. The side cutaway view of FIG. 13 is not to scale with FIG. 13 but is provided to illustrate the spatial arrangement of the circuit board substrate 1010, the sensor 106, the light source 104, the LGF 102, and the cosmetic cover 1018. In the embodiment of FIG. 13, the circuit board substrate includes a conductive layer 1022 located between two non-conductive layers 1024 and 1026. The sensor is electrically connected to traces in the conductive layer and may be physically attached to one of the non-conductive layers and/or to the conductive layer. Although not specifically depicted in FIG. 13, the sensor (and the optical navigation circuit 710 within which the sensor is packaged) is electrically connected to the conductive layer using TSV, although other physical and electrical connection techniques are possible.

In the embodiment of FIG. 13, the LGF 102 is laminated to the top layer 1024 of the circuit board substrate using a glue that has a lower index of refraction than the LGF and the hole 1014 within which the light source is located, is filled with a transparent epoxy 1028 to provide mechanical and electrical discharge (ESD) protection to the light source.

In the embodiment of FIG. 13, a void space 1030 exists between the sensor 106 and a bottom major surface of the LGF 102. The void space may be filled with air or some other fluid or solid material. In an alternative embodiment, the LGF may be laminated directly on top of the sensor or the sensor package.

In the embodiments described above, non-planar elements 402 and 502 on the major surface 112 of the LGF 102 are used to increase the amount of light that exits the LGF 102 at the finger interface surface 114 in order to enhance the amount of light that is scattered/reflected by a user's finger. The non-planar elements described with reference to FIGS. 4A, 4B, and 5 are features that extend above the plane of the major surface of the LGF. In another embodiment, the LGF is configured with an array of features that are located below the plane of the major surface of the LGF. The array of "light extracting features" causes light to exit the LGF at or near the finger interface surface 114. Because the light extracting features cause light to exit the LGF at or near the finger interface surface, the user input device 100 is not dependent on finger contact (and the resulting modification of the TIR at the contacted surface) to cause light to exit the LGF.

The location, arrangement, and shape of the light extracting features controls the location, intensity, and angle of the light that exits the LGF. The location of the light extracting features is selected to correspond to the location of the sensor 106 so that light reflected by a user's finger is incident on the sensor. An example of a location 1032 for the light extracting features is indicated in FIG. 13. The location, arrangement, and shape of the features are ideally selected to optimize the amount of light that exits the LGF and to optimize the angle at which the light exits the LGF. In an embodiment, the location, arrangement, and shape of the light extracting features is selected to emphasize specular highlights and shadows in the user's finger.

Figure 14A:
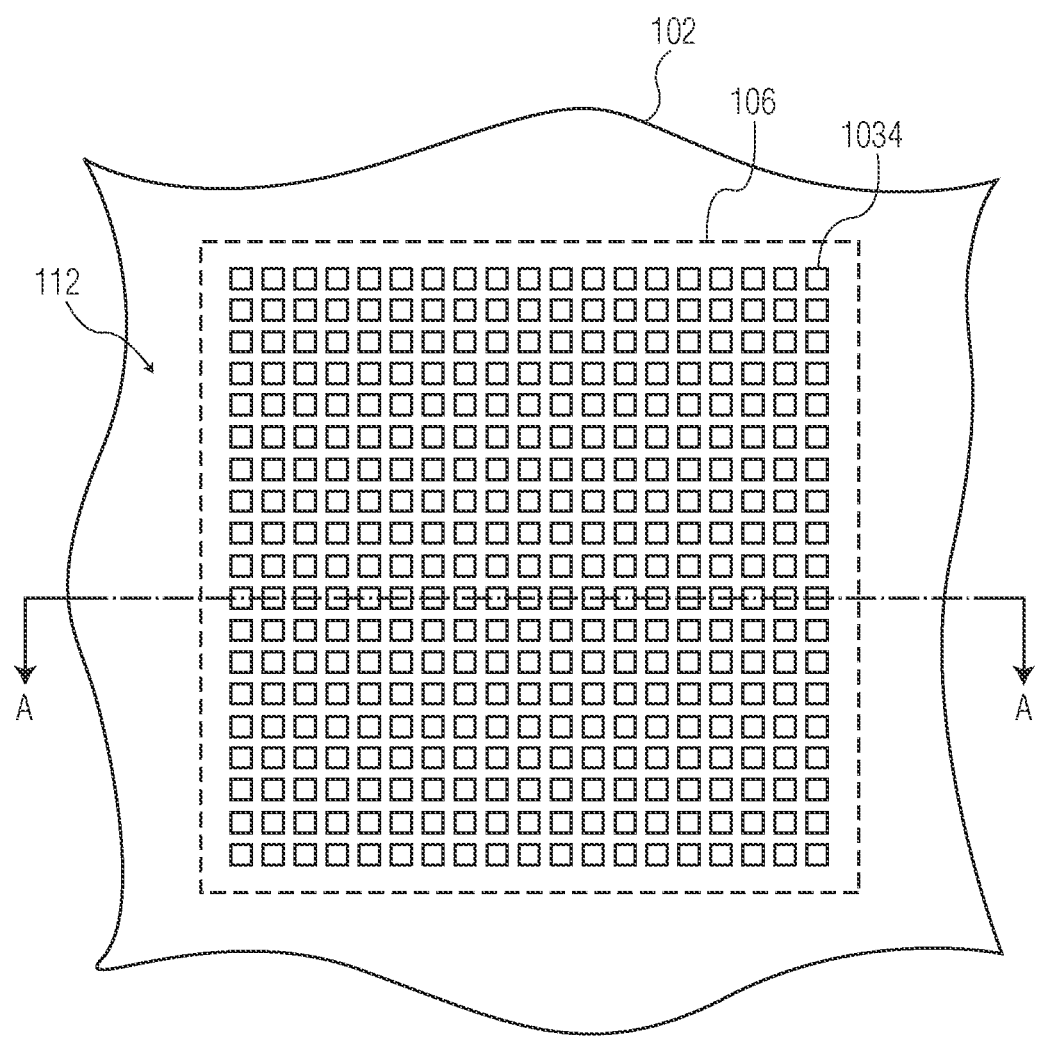
FIG. 14A is a top view of an array of light extracting features in the LGF relative to the location of the sensor.

FIG. 14A is a top view of an array of light extracting features 1034 in the LGF 102 relative to the location of the sensor 106. The features are configured in a 19×19 array of recessions in the top major surface of the LGF. In the embodiment of FIG. 14A, the LGF is approximately 50 um thick and each feature is a 10 um×10 um×10 um recession in the top major surface 112 of the LGF. Additionally, one face of each 10 um×10 um×10 um recession has a 10 um radius cylindrical chamfer. The chamfered faces of the light extracting features are oriented towards the location of the light source 104 in order to extract a portion of the light from the LGF towards a user's finger. Ideally, the light extracting features extract enough light to enable accurate tracking but not so much light that the quality of image features is degraded to a point where movement tracking becomes inaccurate.

Figure 14B:
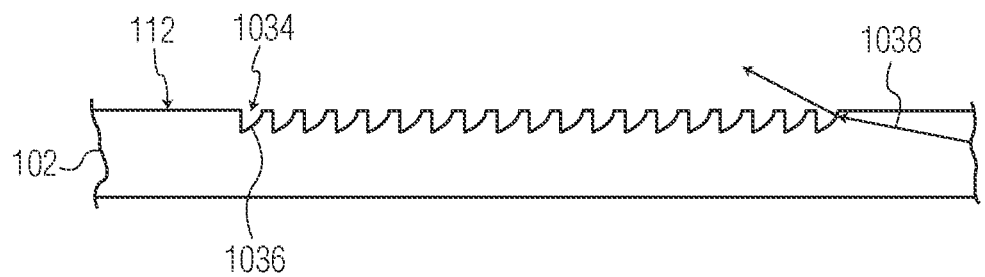
FIG. 14B is a side cutaway view of the LGF from FIG. 14A at section line A-A.

FIG. 14B is a side cutaway view of the LGF 102 from FIG. 14A at section line A-A. FIG. 14B illustrates that the light extracting features 1034 are recessions in the LGF that extend below the plane of the top major surface 112 of the LGF. In the embodiment of FIG. 14B, chamfered faces 1036 of the light extracting features face towards the location of the light source 104 such that the injected light 1038 is incident on the light extracting features at the chamfered faces. In particular, in FIG. 14B, light propagates through the LGF because of TIR and then encounters the chamfered face of one of the light extracting features. The angle of the chamfered faces does not cause TIR and therefore the light exits the LGF. The light that exits the LGF is reflected when a user's finger is in contact with, or in close proximity to, the LGF. A portion of the reflected light will pass back through the LGF and be detected by the sensor.

Figure 15:
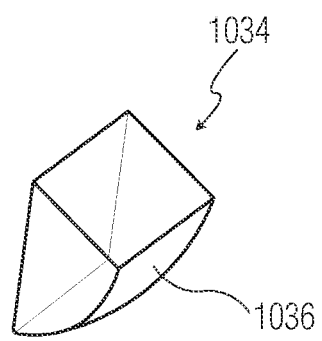
FIG. 15 depicts a perspective view of an embodiment of one of the light extracting features from FIGS. 14A and 14B.

FIG. 15 depicts a perspective view of an embodiment of one of the light extracting features 1034 from FIGS. 14A and 14B. In the embodiment of FIG. 15, the light extracting feature is a 10 um×10 um×10 um recession in the LGF with one of the faces 1036 of the recession being rounded or chamfered at a 10 um radius. Although some examples of the location, arrangement, and shape of the array of light extracting features is described herein, other locations, arrangements, and shapes are possible.

Figure 16:
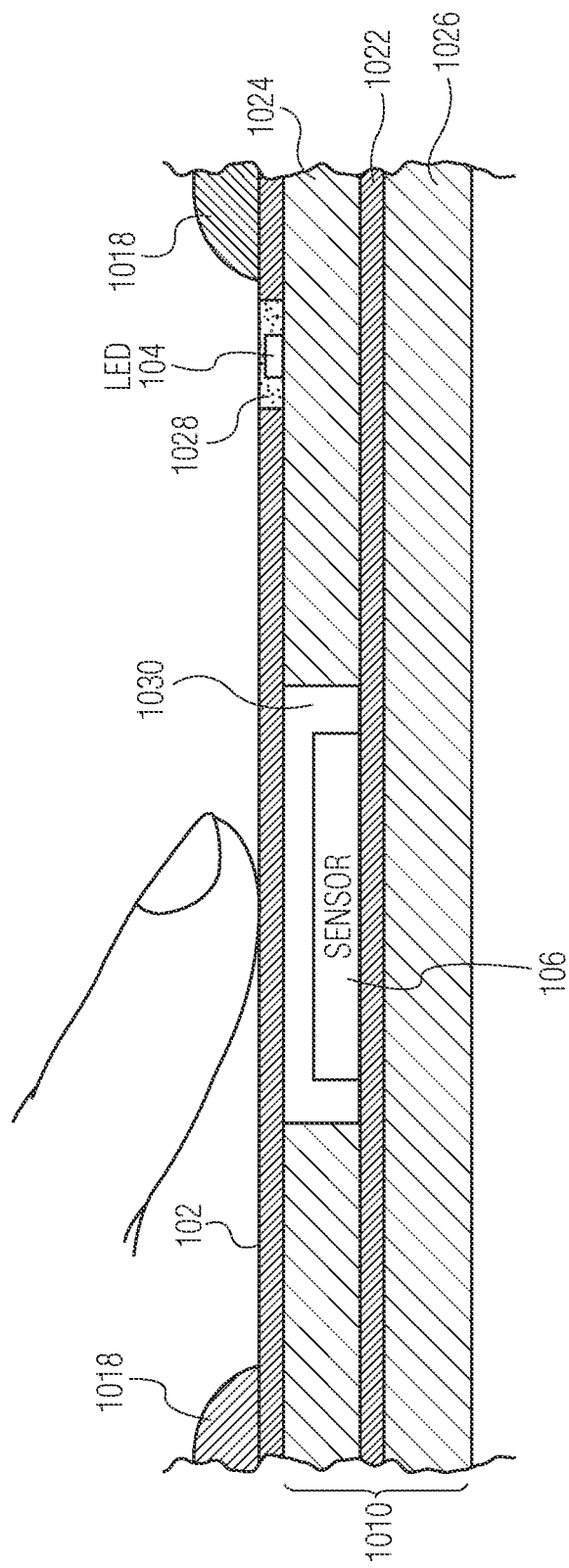
FIG. 16 depicts a user's finger in contact with the LGF at the location of the light extracting features.

FIG. 16 depicts a user's finger in contact with the LGF at the location of the light extracting features. Lateral movement of the user's finger relative to the sensor will cause a corresponding movement of a navigation indicator in a portable electronic system.

In an embodiment, a illumination region on the LGF of approximately 1 mm×1 mm is desired directly over the sensor. In an embodiment, the LGF can be dyed to a desired color. For example, the LGF can be dyed to appear black to human observers while passing infrared light.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical finger navigation device comprising:
   a light guide film (LGF), wherein at least a portion of the LGF exhibits total internal reflection (TIR);
   a light source in optical communication with the LGF and configured to inject light into the LGF;
   a sensor configured to detect light that exits from the LGF after being reflected from a finger that is proximate the LGF; and
   a navigation engine configured to generate lateral movement information, which is indicative of lateral movement of the finger relative to the sensor, in response to light that is reflected from the finger and detected by the sensor;
wherein the LGF is between 10 microns and 100 microns thick; and
further comprising a circuit board substrate, wherein the light source, the sensor, and the navigation engine are attached to the circuit board substrate and wherein the LGF is laminated directly to the circuit board substrate with no intervening optical lenses between the circuit board substrate and the LGF.

2. The optical finger navigation device of claim 1, wherein the LGF comprises a major surface and a side edge and wherein the light source is configured to inject light into the LGF at the side edge.

3. The optical navigation device of claim 2, wherein the LGF is configured with a hole that corresponds to the location of the light source, wherein the major surface of the LGF is parallel to a major surface of the circuit board substrate.

4. The optical navigation device of claim 3, wherein the hole in the LGF is formed by an edge of the LGF that is perpendicular to the major surface of the LFG.

5. The optical navigation device of claim 3, wherein the hole is filled with a transparent epoxy.

6. The optical finger navigation device of claim 1, wherein the LGF comprises a plurality of light extracting features that cause light to exit the LGF through a surface that is opposite the sensor.

7. The optical finger navigation device of claim 6, wherein the plurality of light extracting features comprise a plurality of recessions at a major surface of the LGF.

8. The optical finger navigation device of claim 6, wherein the plurality of light extracting features are formed within the LGF.

9. The optical finger navigation device of claim 1, wherein the LGF comprises a major surface with a planar portion and a plurality of non-planar elements at least partially out of plane with the planar portion, wherein the non-planar elements cause light to exit the LGF.

10. The optical finger navigation device of claim 9, wherein the non-planar elements comprise a plurality of light extracting features that are recessed below the major surface of the LGF.

11. The optical finger navigation device of claim 9, wherein the plurality of light extracting features comprises an array of recessions with cylindrical chamfers.

12. The optical finger navigation device of claim 9, wherein the plurality of non-planar elements are shaped to emphasize specular highlights and shadows in the finger.

13. An optical finger navigation device comprising:
a circuit board substrate;
a sensor attached to the circuit board substrate, the sensor including an array of distinct photodetectors;
a light guide film (LGF) of between 10 microns and 100 microns thick that is attached directly to the circuit board substrate with no optical lenses between the circuit board substrate and the LGF and located proximate the sensor such that the sensor is between the circuit board and at least a portion of the LGF with no optical lenses between the sensor and the LGF;
a light source attached to the circuit board substrate and configured to inject light into an edge surface of the LGF; and
a navigation engine configured to generate movement information, which is indicative of movement of a finger relative to the sensor, in response to light that is reflected from the finger and detected by the sensor.

14. The optical finger navigation device of claim 13, wherein the LGF is laminated directly to the circuit board substrate with a glue that has a lower index of refraction than the LGF.

15. The optical finger navigation device of claim 13, wherein the LGF comprises a plurality of light extracting features.

16. A portable hand-held electronic system comprising:
a display comprising a navigation indicator;
an optical finger navigation device configured to generate a navigation signal to move the navigation indicator based on a change in a detected light pattern according to movement of a finger relative to the optical finger navigation device, the optical finger navigation device comprising;
a circuit board;
a light guide film (LGF) of between 10 microns and 100 microns thick, wherein at least a portion of the LGF exhibits total internal reflection (TIR) and wherein the LGF is laminated directly to the circuit board substrate with no optical lenses between the circuit board substrate and the LGF;
a light source attached to the circuit board substrate and in optical communication with the LGF and configured to inject light into the LGF;
a sensor attached to the circuit board substrate and configured to detect light that exits from the LGF after the light is reflected from the finger; and
a navigation engine configured to generate lateral movement information, which is indicative of lateral movement of the finger relative to the sensor, in response to light that is reflected by the finger and detected by the sensor.

17. The portable hand-held electronic system of claim 16, wherein the LGF comprises a plurality of light extracting features that cause light to exit the LGF.

18. The portable hand-held electronic system of claim 16, wherein the LGF comprises a major surface and wherein the plurality of light extracting features comprise a plurality of recessions in the LGF at the major surface.

19. The portable hand-held electronic system of claim 16, wherein the LGF comprises a major surface and a side edge and wherein the light source is configured to inject light into the LGF at the side edge.

20. The portable hand-held electronic system of claim 16, wherein the LGF comprises a major surface and a side edge that forms a hole completely through the LFG and wherein the light source is located within the hole in the LGF such that light is injected into the LGF at the side edge the LGF and wherein void space in the hole is filled with a transparent epoxy.

* * * * *